May 8, 1951 W. A. ZAVOD 2,552,248
COUPLING FOR FISHHOOKS AND LEADERS
Filed Jan. 19, 1949

INVENTOR.
WILLIAM A. ZAVOD
BY
ATTORNEY

Patented May 8, 1951

2,552,248

UNITED STATES PATENT OFFICE 2,552,248

COUPLING FOR FISH HOOKS AND LEADERS

William A. Zavod, Mount Vernon, N. Y.

Application January 19, 1949, Serial No. 71,629

10 Claims. (Cl. 287—1)

This invention relates to new and useful improvements in fish-line attachments, and, more particularly, the aim is to provide a novel and valuable securing means for a fish hook and the lead line or fish line.

The object of the invention is to provide a device incorporating a substantially instantaneously manually effectuable means for securing the fish hook to the device and also such a means for similarly securing to the device a line, with these two securing means independently openable and closable, and with each so constituted that it includes a member spirally twirlable in one direction for dependably securing the part to be affixed to the device and spirally twirlable in the opposite direction to break such lock, and, further, with said twirlable members so carried by a single main structure of the device that accidental loss of either of said members is impossible.

One or more of the parts of the new device may be of steel, to provide a set-up known among anglers as a jig, that is, a fish hook loaded with a bright heavy metal; or, where weighting of the fishing tackle in the immediate vicinity of the hook is not desired, one or more of the parts of the device may be made of a light weight metal, such as aluminum, or of a plastic, or of other suitable material.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 side elevationally shows a now favored embodiment of the invention, with the two end spirally twirlable members in locking position, and with one of said members now securing the fish hook to the device and with the other of said members now securing to the device a looped end of a line.

Fig. 2 is an enlarged view showing the parts of Fig. 1, following axial rotation of said parts through 90°, to show the hook in rear elevation with two elements of the main structure of the device shown side elevationally, with a coupling sleeve at about the center of length of said main structure shown in axial section, and with the said two twirlable members retracted to break both locks.

Fig. 3 shows, on a further enlarged scale, that one of the two elements of the main structure other than said sleeve for coacting with one of said twirlable members for locking the hook, this element viewed as in Fig. 2; and also illustrates the force-fit assisting annular enlargement which may be incorporated at a shank portion of said element during its fabrication as such in preparation for final assembly in the main structure of the device.

Fig. 4 is an end elevation of Fig. 3.

Fig. 5 shows, on the same scale as in Fig. 3, that one of the two main elements of the main structure of the device for coacting with the other of said twirlable members for locking the line; this element of the main structure is viewed as though having been axially rotated through 90° from its disposition in Fig. 2, and said element being illustrated as at its shank portion incorporating an annular enlargement analogous in nature and function to the shank enlargement shown in Fig. 3.

Figure 1:
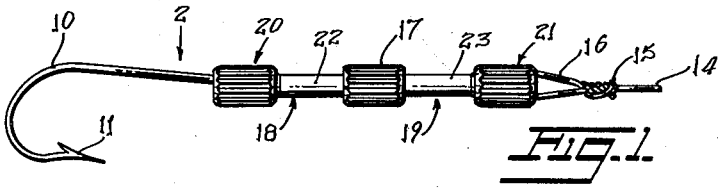

Referring to the drawings more in detail, a fish hook 10, having a barb 11, is shown as shaped to have at the upper end of its shank the conventional eye 12; and a line 14 is shown as knotted as at 15 to include the conventional looped end 16.

Thus, as will appear in a moment, one of the advantages of the invention, although comparatively a lesser one than others thereof, is that a hook with a special shape at the upper end of its shank does not have to be procured, and also the usual sometimes prefabricated loop at the end of a lead line, particularly when such line is of catgut, nylon or the like, may be used as is in connection with the new device.

The already mentioned main structure of the device is here shown as comprising three parts, each as a whole designated 17, 18 or 19. One of the two spirally twirlable members is as a whole marked 20, and the other similarly is designated 21.

Each of the parts 18 and 19 includes an integral shank portion 22 or 23, which desirably may be threaded as at 24 or 25 and is adapted to engage the threaded portions 17a and 17b, respectively, in the member 17. Each of said parts 18 and 19 also integrally includes a portion of larger diameter threaded as at 26 or 27. Said threads, desirably, as shown, are so laid down as to be of the same hand when the main structure is assembled as in Fig. 2.

Referring now particularly to the part 18 and to its cooperative spirally twirlable member 20, below called the thimble 20, said part 18, beyond its thread 26, has a cylindrical end portion of a diameter equal to the diameter of the thread 26 at the land of the latter; this cylindrical end portion, however, having its cylindricity interrupted in part by a transverse slot to provide a recess having a flat floor 28 and in further part by a longitudinally extending slot to extend said floor 28 as at 29, thereby to give said floor substantially the same outline as that of a T. The floor 28—29 at its portion 28 extends into the threaded portion of the part 18, thereby to establish a fraction of the length of said thread 26 as a so-called mutilated or interrupted one.

Figure 7:
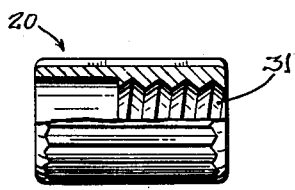
Fig. 7 is, on the same scale, a partial side elevational and a partial longitudinal sectional view of the twirlable member operatively associated with that part of the main structure of the device which is shown in Fig. 3.

The thimble 20 (see Fig. 7) has an internal thread 31 matching and of the same length as said thread 26. This thread 31, however, extends only along a part of the length of said thimble, and at the outer end of the latter the same has a cylindrical bore concentric with the axis of the thread 31 and of a diameter equal to the diameter of the thread 31, not at the land thereof, but at the groove thereof.

Figure 5:
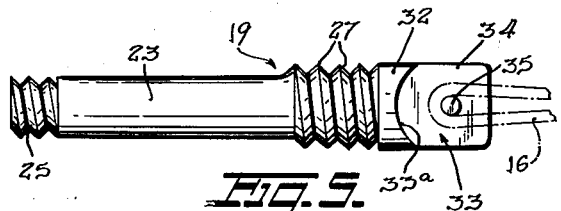
Figure 6:
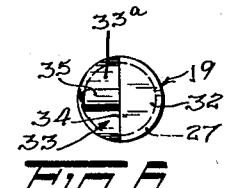
Fig. 6 is an end elevation of the part shown in Fig. 5.

Referring next particularly to the part 19 and to its cooperative spirally twirlable member 21, below called the thimble 21, said part 19, beyond its thread 27, has a cylindrical end portion 32 of a diameter equal to the diameter of said thread 27 at the land of the latter; this cylindrical end portion, however, having its cylindricity interrupted as a consequence of the application of a hollow milling tool or the like (when the part 19 is made of metal), for gouging out the material of said part to provide (see particularly Figs. 5 and 6) a recess 33 having an arcuately contoured end wall 33ª and a flat floor 34 surrounding the root portion of a post 35.

With the thread 27 desirably of the same length, pitch and type as the thread 26, the thimble 21 is preferably, as shown, exactly like the thimble, as to length, outer diameter, its milled exterior as indicated, the length and diameter of its cylindrical bore and the length and type of its thread 36; said thread 36 being of the same hand as the thread 31 in the thimble 20, to the end that both thimbles may be simultaneously turned, one in one direction and the other in the other direction, to jam both thimbles to locking positions.

Figure 2:
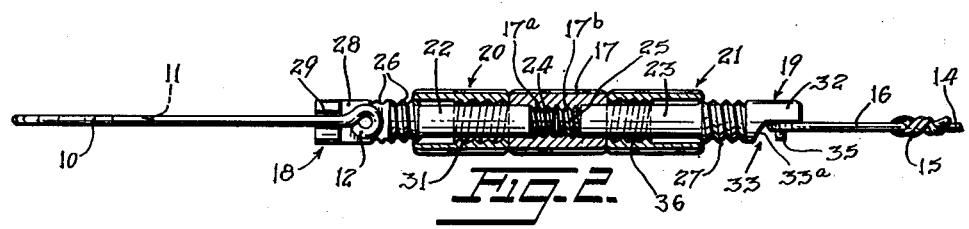
Figure 3:
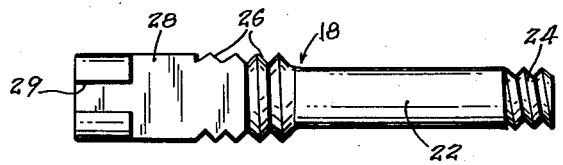
Figure 4:
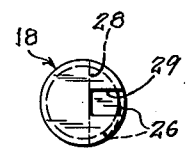

With the parts 18 and 19 (following a placement thereon of the thimbles 20 and 21 in the relation indicated in Fig. 2) inseparably coupled as by threading the shank portions 22 and 23 of said parts 18 and 19 into the third part 17 of the main structure of the device, this part 17 being a cylindrically bored sleeve preferably of the same length as the thimbles 20 and 21, either thimble may be twirled in one direction to dispose it as in Fig. 1, or twirled in the opposite direction to dispose it as in Fig. 2.

With the thimble 20 disposed as in Fig. 2, the hook 10, if previously in place on the device, may be removed and a different hook substituted, or said hook 10 may be placed relative to the floor 28—29 as illustrated. Then, to lock the hook in the device, it is merely necessary to twirl the thimble 20 in the proper direction; whereupon, aided by the present abutment of said thimble against the sleeve 17, instantaneous engagement will occur between the threads 31 and 26. Said sleeve 17 is also desirably knurled or (as shown) milled, whereby, with the thimble 20 similarly knurled or milled, said thimble, by finger twist alone, with a reactive finger grip applied at the same time to the sleeve 17, may be so tightly jammed into its placement pursuant to Fig. 1 that accidental loosening thereof is absolutely insured against, with the final result, as is self-evident, that the hook 10 can not become displaced from the device. Furthermore, thimble 20 can not become disconnected from the remainder of the device, due to the fact that it can not be spirally advanced beyond the outer end of the thread 26.

When the thimble 21 is disposed as in Fig. 2, the loop 16 of the line 15 may be hung on the post 35. Then, to lock such line to the device, it is merely necessary to twirl the thimble 21 in the proper direction, whereupon, here again, aided by the present abutment of said thimble against the sleeve 17, instantaneous engagement will occur between the threads 36 and 27. With the thimble 21 also desirably knurled or (as shown) milled, the same advantage in regard to tight manual securement of said thimble in locking position is had as just above explained in connection with the thimble 20; and in the case of the thimble 21, as in the case of the thimble 20, the thimble 21 can not become disconnected from the remainder of the device.

As the shank portions 22 and 23 of, respectively, elements 18 and 19 are illustrated in Fig. 2, their meeting ends in the sleeve 17 are shown as spaced somewhat apart, but this is merely for clarifying the drawing as, desirably, said ends are abutted, and preferably with both shank portions 22 and 23 moved into the bore of said sleeve to a like extent.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A device for the purpose described, comprising an elongated main structure, said main structure having at one end a recess which opens to the said one end for receiving the eye and a portion of the shank of a fishhook, said main structure having an external thread adjacent to but inward of said recess, said main structure having at its other end a second recess which opens to said other end for receiving the loop at the end of a fish line, means within said second recess over which the loop of the fish line can be engaged, said main structure having a second external thread adjacent to but inward of said second recess, a first thimble internally threaded and engaged with said first thread for spiral adjustment outward on said main structure toward said one end to lock the eye of the fishhook in the first recess, and a second thimble internally threaded and engaged with said second thread for spiral adjustment outward on said main structure toward said other end of said main structure to lock the loop of the fish line in said second recess and retain the loop in engagement with said means.

2. A device for the purpose described, comprising an elongated main structure, said main structure having at one end a recess which opens to the said one end for receiving the eye and a portion of the shank of a fishhook, said main structure having an external thread adjacent to but inward of said recess, said main structure having at its other end a second recess which opens to said other end for receiving the loop at the end of a fish line, means within said second recess over which the loop of the fish line can be engaged, said main structure having a second external thread adjacent to but inward of said second recess, a first thimble internally threaded and engaged with said first thread for spiral adjustment outward on said main structure toward said one end to lock the eye of the fishhook in the first recess, a second thimble internally threaded and engaged with said second thread for spiral adjustment outward on said main structure toward said other end of said main structure to lock the loop of the fish line in said second recess and retain the loop in engagement with said means, said main structure being formed of end aligned members having adjacent ends threaded, and an internally threaded tubular member threaded onto the ends of said end aligned members joining them together.

3. A device for the purpose described, comprising an elongated main structure, said main structure having at one end a recess which opens to the said one end for receiving the eye and a portion of the shank of a fishhook, said main structure having an external thread adjacent to but inward of said recess, said main structure having at its other end a second recess which opens to said other end for receiving the loop at the end of a fish line, means within said second recess over which the loop of the fish line can be engaged, said main structure having a second external thread adjacent to but inward of said second recess, a first thimble internally threaded and engaged with said first thread for spiral adjustment outward on said main structure toward said one end to lock the eye of the fishhook in the first recess, and a second thimble internally threaded and engaged with said second thread for spiral adjustment outward on said main structure toward said other end of said main structure to lock the loop of the fish line in said second recess and retain the loop in engagement with said means, said means comprising a post within said second recess and over which the loop of the fish line is to be engaged.

4. A device for the purpose described, comprising an elongated main structure, said main structure having at one end a recess which opens to the said one end for receiving the eye and a portion of the shank of a fishhook, said main structure having an external thread adjacent to but inward of said recess, said main structure having at its other end a second recess which opens to said other end for receiving the loop at the end of a fish line, means within said second recess over which the loop of the fish line can be engaged, said main structure having a second external thread adjacent to but inward of said second recess, a first thimble internally threaded and engaged with said first thread for spiral adjustment outward on said main structure toward said one end to lock the eye of the fishhook in the first recess, and a second thimble internally threaded and engaged with said second thread for spiral adjustment outward on said main structure toward said other end of said main structure to lock the loop of the fish line in said second recess and retain the loop in engagement with said means, said first recess being an open topped T-shaped slot.

5. A device for the purpose described, comprising an elongated main structure, said main structure having at one end a recess which opens to the said one end for receiving the eye and a portion of the shank of a fishhook, said main structure having an external thread adjacent to but inward of said recess, said main structure having at its other end a second recess which opens to said other end for receiving the loop at the end of a fish line, means within said second recess over which the loop of the fish line can be engaged, said main structure having a second external thread adjacent to but inward of said second recess, a first thimble internally threaded and engaged with said first thread for spiral adjustment outward on said main structure toward said one end to lock the eye of the fishhook in the first recess, and a second thimble internally threaded and engaged with said second thread for spiral adjustment outward on said main structure toward said other end of said main structure to lock the loop of the fish line in said second recess and retain the loop in engagement with said means, both of said recesses being extended longitudinally of the main structure.

6. A device for the purpose described, comprising an elongated main structure, said main structure having at one end a recess which opens to the said one end for receiving the eye and a portion of the shank of a fishhook, said main structure having an external thread adjacent to but inward of said recess, said main structure having at its other end a second recess which opens to said other end for receiving the loop at the end of a fish line, means within said second recess over which the loop of the fish line can be engaged, said main structure having a second external thread adjacent to but inward of said second recess, a first thimble internally threaded and engaged with said first thread for spiral adjustment outward on said main structure toward said one end to lock the eye of the fishhook in the first recess, and a second thimble internally threaded and engaged with said second thread for spiral adjustment outward on said main structure toward said other end of said main structure to lock the loop of the fish line in said second recess and retain the loop in engagement with said means, both of said recesses being extended longitudinally of the main structure, both of said recesses being located on one side of the longitudinal axis of said main structure.

7. A device for the purpose described, comprising an elongated main structure, said main structure having at one end a recess which opens to the said one end for receiving the eye and a portion of the shank of a fishhook, said main structure having an external thread adjacent to but inward of said recess, said main structure having at its other end a second recess which opens to said other end for receiving the loop at the end of a fish line, means within said second recess over which the loop of the fish line can be engaged, said main structure having a second external thread adjacent to but inward of said second recess, a first thimble internally threaded and engaged with said first thread for spiral adjustment outward on said main structure toward said one end to lock the eye of the fishhook in the first recess, and a second thimble internally threaded and engaged with said second thread for spiral adjustment outward on said main structure toward said other end of said main structure to lock the loop of the fish line in said second recess and retain the loop in engagement with said means, said first recess being an open topped T-shaped slot, the said thread adjacent said T-shaped slot being a mutilated one.

8. A device for the purpose described, comprising an elongated main structure, said main structure having at one end a recess which opens to the said one end for receiving the eye and a portion of the shank of a fishhook, said main structure having an external thread adjacent to but inward of said recess, said main structure having at its other end a second recess which opens to said other end for receiving the loop at the end of a fish line, means within said second recess over which the loop of the fish line can be engaged, said main structure having a second external thread adjacent to but inward of said second recess, a first thimble internally threaded and engaged with said first thread for spiral adjustment outward on said main structure toward said one end to lock the eye of the fishhook in the first recess, and a second thimble internally threaded and engaged with said second thread for spiral adjustment outward on said main structure toward said other end of said main structure to lock the loop of the fish line in said second recess and retain the loop in engagement with said means, said first-named external thread being a mutilated one.

9. A device for the purpose described, comprising an elongated main structure, said main structure having at one end a recess which opens to the said one end for receiving the eye and a portion of the shank of a fishhook, said main structure having an external thread adjacent to but inward of said recess, said main structure having at its other end a second recess which opens to said other end for receiving the loop at the end of a fish line, means within said second recess over which the loop of the fish line can be engaged, said main structure having a second external thread adjacent to but inward of said second recess, a first thimble internally threaded and engaged with said first thread for spiral adjustment outward on said main structure toward said one end to lock the eye of the fishhook in the first recess, and a second thimble internally threaded and engaged with said second thread for spiral adjustment outward on said main structure toward said other end of said main structure to lock the loop of the fish line in said second recess and retain the loop in engagement with said means, said main structure having an unevenly surfaced enlarged portion intermediate of said recesses and both of said thimbles having uneven exterior surfaces.

10. A device for the purpose described, comprising an elongated main structure, said main structure having at one end a recess which opens to the said one end for receiving the eye and a portion of the shank of a fishhook, said main structure having an external thread adjacent to but inward of said recess, said main structure having at its other end a second recess which opens to said other end for receiving the loop at the end of a fish line, means within said second recess over which the loop of the fishline can be engaged, said main structure having a second external thread adjacent to but inward of said second recess, a first thimble internally threaded and engaged with said first thread for spiral adjustment outward on said main structure toward said one end to lock the eye of the fishhook in the first recess, and a second thimble internally threaded and engaged with said second thread for spiral adjustment outward on said main structure toward said other end of said main structure to lock the loop of the fish line in said second recess and retain the loop in engagement with said means, said main structure having two end aligned sub-divisions, each of said sub-divisions carrying at its outer end one of said recesses, and means connecting together the adjacent ends of said sub-divisions.

WILLIAM A. ZAVOD.

No references cited.